C. L. FRENCH.
Device for Transmitting Rotary Motion.
No. 224,169. Patented Feb. 3, 1880.
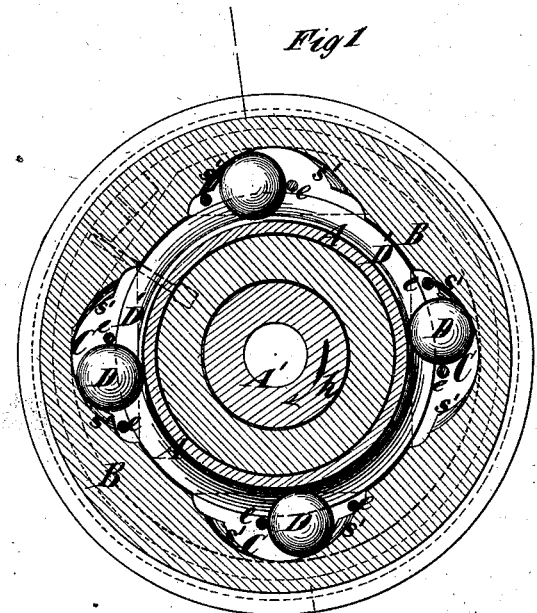
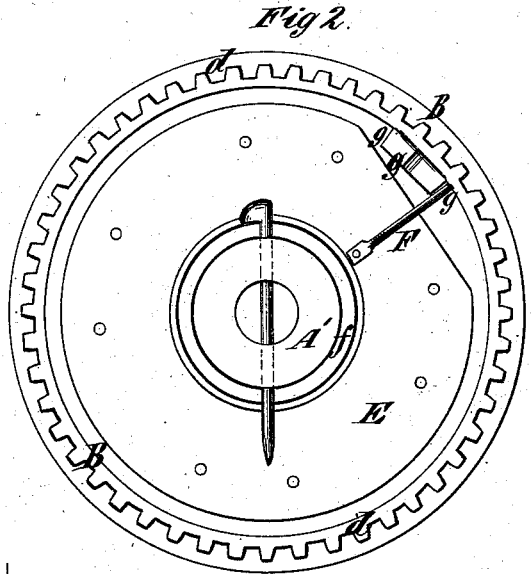
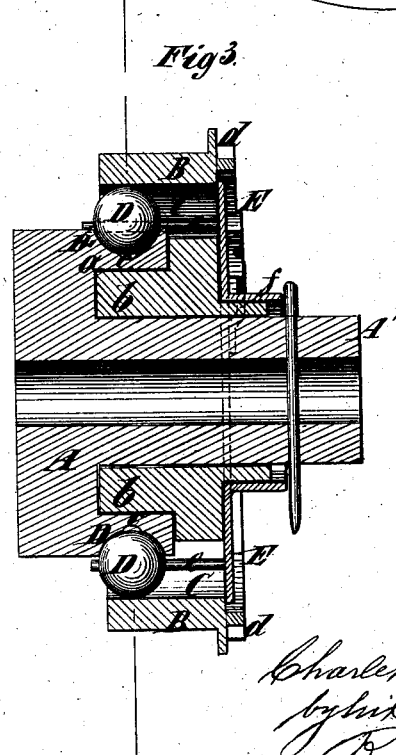

UNITED STATES PATENT OFFICE.

CHARLES L. FRENCH, OF BROOKLYN, NEW YORK.

DEVICE FOR TRANSMITTING ROTARY MOTION.

SPECIFICATION forming part of Letters Patent No. 224,169, dated February 3, 1880.

Application filed December 19, 1879.

*To all whom it may concern:*

Be it known that I, CHARLES L. FRENCH, of Brooklyn, in the county of Kings and State of New York, have invented certain new and useful Improvements in Means for Transmitting Rotary Motion, of which the following is a specification.

My invention is applicable for use in various kinds of machinery for transmitting rotary motion from a continuously-rotating shaft or wheel, or for converting an alternate rotary or oscillating motion into direct rotary motion in either direction.

My invention consists, mainly, in the combination, with a hub or shaft and a drum mounted loosely thereon, and provided with openings or recesses having curved or inclined surfaces between it and the hub or shaft, of rollers arranged in said recesses or openings, and an oscillating disk or carrier provided with projecting forks or fingers which embrace said rollers, and by which they may be so moved or adjusted in the said recesses or openings as to be capable of transmitting the rotary motion in either direction, as may be desired, or as to be inoperative when it is not desired to transmit the motion.

It also consists in certain details of construction, as will be hereinafter fully described.

In the accompanying drawings, Figure 1 represents a transverse section of a clutch embodying my invention. Fig. 2 represents a rear view thereof, and Fig. 3 represents a longitudinal central section through said clutch.

Similar letters of reference designate corresponding parts in all the figures.

A designates a hub, in the present instance represented as formed in one piece with the shaft A', but which might be formed separately therefrom and secured thereto.

B designates a drum arranged loosely around said hub and having a bearing upon the shaft A'. To further support and steady it I have shown the hub as provided in its end with an annular groove, $a$, and the drum as provided with an annular rib or flange, $b$, fitting therein.

Between the drum and hub, and in this example of my invention formed entirely in the inner circumference of the drum, are recesses or openings C, which are here represented as approximately segmental, though the sides might be straight and slant inward from the top of the opening, so that each opening presents two inclined surfaces, $s\ s'$, as shown in Fig. 1. Arranged within these recesses or openings are rollers D, which are here represented as of spherical form, though cylindric or other shaped rollers might be employed. These rollers may be made of some elastic material, such as india-rubber, and the hub A has formed in it an annular circumferential groove, D', made of a form to nearly fit the circumference of the rollers D. At the bottom of this groove is preferably formed a smaller groove, $c$, which enables the elastic rollers to have a firmer bite or hold upon the hub.

If desirable, the surface of the rollers and the surfaces of the hub or shaft and drum bearing on said rollers might be roughened in any suitable manner to increase the hold or bite of the rollers.

If desirable for any reason, the groove D' might be formed in the inner surface of the drum B and the circumference of the hub A left plain or grooved also.

Motion may be either imparted to the shaft A' and transmitted to the drum or imparted to the drum—as, for instance, by gear-teeth $d$, and by it transmitted to the shaft A'.

In order to provide for transmitting motion in either direction from the oscillating or alternate rotary motion of one of the parts, I employ fingers $e$, which are arranged in pairs, so as to constitute practically forks to embrace the rollers D, and which project from a disk or carrier, E. This disk or carrier is mounted upon a hub, $f$, projecting from the drum B, and is adapted to be oscillated so as to move the rollers D toward either side of the recesses or openings C.

F designates an arm or lever extending from the spider or disk E and engaging with one of three catches or notches, $g$, in the drum B. The said arm or lever is preferably made of small size, so that its flexure will constitute a spring for holding it in engagement with either of the catches or notches.

When it is desired to rotate the shaft A' in the direction of the arrow $h$, Fig. 1, the rollers are shifted into the position there shown, so that they will operate in contact with the inclined surfaces $s$ $s'$ of their respective recesses C C; but when it is desired to rotate said shaft in the opposite direction the disk or carrier E is moved, and the rollers shifted to the opposite sides of the recesses or openings to operate in contact with the inclined surfaces $s$ $s'$. When it is desired to make the clutch inoperative the spider or disk is turned or moved so as to hold the rollers centrally in the recesses or openings C, and so prevent them from operating on or being operated upon by the inclined surfaces $s$ $s'$ of said recesses, and when so placed the drum B and hub A can be rotated in either direction independently of each other.

What I claim as my invention, and desire to secure by Letters Patent, is—

1. The combination, with a hub or shaft and a drum mounted loosely thereon and provided with openings or recesses having inclined or curved surfaces between it and the hub or shaft, of rollers loosely arranged in said recesses or openings, and an oscillating disk or carrier provided with forks or pairs of projecting fingers which embrace said rollers, and by which they may be moved or adjusted in the said recesses or openings for the purpose of transmitting rotary motion in either direction or rendering them inoperative, substantially as specified.

2. The combination, with a hub or shaft provided with a peripherical groove, and a drum mounted loosely upon said hub or shaft opposite to said groove, and provided with recesses or openings having surfaces inclined in opposite directions, of spherical rollers loosely arranged in said recesses or openings resting in said groove between fingers, substantially as specified.

3. The combination of the hub A, provided with the groove D' and the groove $c$ at the bottom thereof, the drum B, fitting loosely around said hub, and provided with recesses or openings C, and the spherical rollers D, loosely arranged in said recesses or openings, substantially as specified.

4. The combination of the hub A, provided in its end with the groove $a$, the drum B, provided with the rib or flange $b$, and with the recesses or openings C, and the rollers D, loosely arranged between said hub and drum in said recesses or openings, substantially as specified.

5. The combination, with the hub A, the drum B, fitting loosely around the same, and provided with recesses or openings C, and the rollers D, of the oscillating disk or carrier E, provided with forks or pairs of fingers $e$, which embrace said rollers, the lever or arm F extending from said disk or carrier, and engaging with catches $g$ in said drum, substantially as specified.

CHAS. L. FRENCH.

Witnesses:
AUSTIN D. MIDDLETON,
FREDK. HAYNES.